United States Patent [11] 3,613,925

| [72] | Inventor | Linly R. Stum<br>Box 297, Towner, Colo. 81081 |
|---|---|---|
| [21] | Appl. No. | 848,157 |
| [22] | Filed | Aug. 7, 1969 |
| [45] | Patented | Oct. 19, 1971 |

[54] IMPLEMENT CARRIER
4 Claims, 5 Drawing Figs.

[52] U.S. Cl. .................................................. 214/394, 212/14
[51] Int. Cl. .................................................. B60p 3/00
[50] Field of Search ........................................ 214/394, 396; 212/14; 172/780

[56] References Cited
UNITED STATES PATENTS

| 2,376,296 | 5/1945 | Walter | 214/394 |
|---|---|---|---|
| 2,533,999 | 12/1950 | Colley | 214/394 |
| 2,546,472 | 3/1951 | O'Connor | 214/394 |
| 2,625,372 | 1/1953 | Yerian | 254/139.1 |
| 2,750,197 | 6/1956 | Tripp | 214/396 X |
| 2,875,911 | 3/1959 | Jennings et al. | 214/394 |
| 2,407,780 | 9/1946 | Gurries | 172/780 |

*Primary Examiner*—Albert J. Makay
*Attorney*—C. B. Messenger

ABSTRACT: A wheel mounted unit for carrying farm implements from site to site with the implements hoisted above ground contact and suspended from an elevated bridge-type support structure by powered retractable chains or cables. A fifth wheel towing attachment and steered rear wheels are provided to support and guide the unit, which is of substantial length. Remote controls are provided for steering operations and for powered positioning of the implement suspension elements.

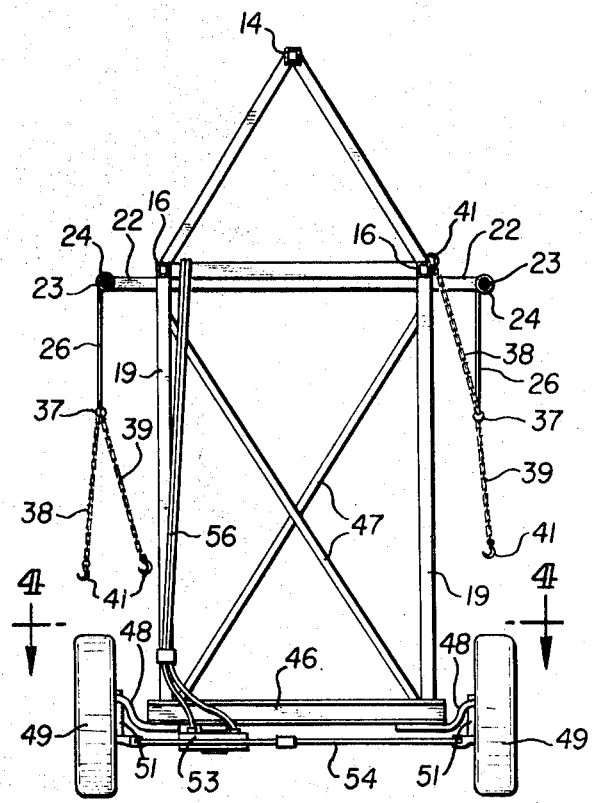
Fig_2
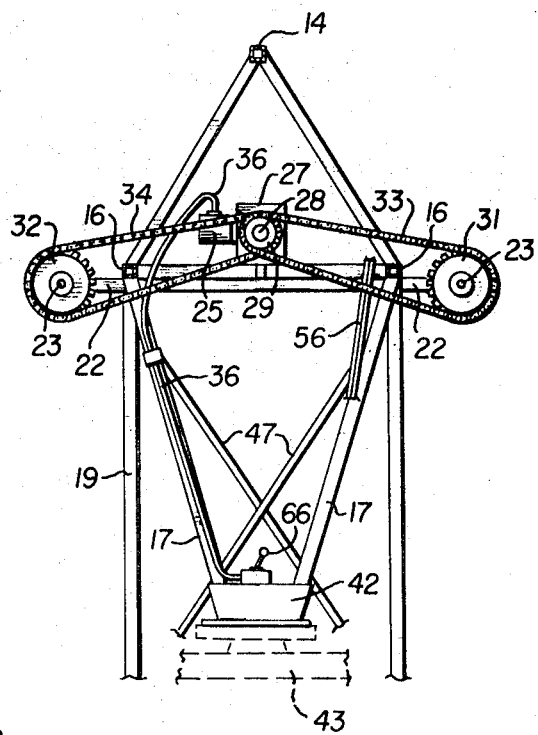
Fig_3
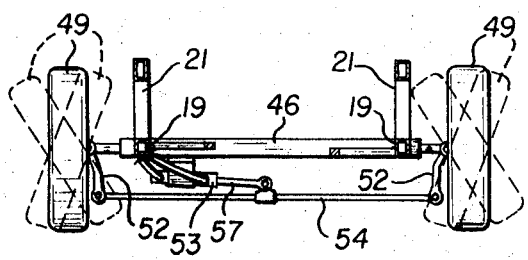
Fig_4
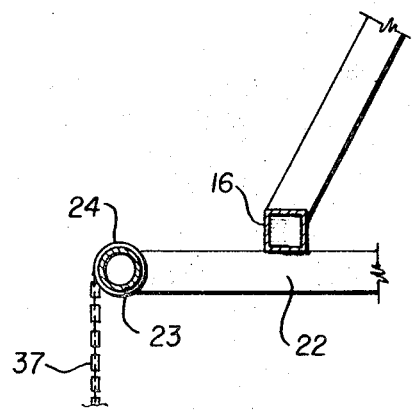
Fig_5

IMPLEMENT CARRIER

BACKGROUND OF THE INVENTION

In modern agriculture the conservation of labor is of increasing importance. In connection with a present trend to increased horsepower for motive equipment, it is now necessary to use wider and larger equipment that will cover more ground in less time. The handling of this equipment between periods of use and the moving of the equipment from field to field presents a considerable problem due to the cumbersome and unwieldy nature of such equipment. Further, as wider and heavier equipment is used it becomes impractical to move such equipment along highways or even along country roads even though transport wheels may be provided by the equipment. The present invention is developed to solve some of these handling and transportation problems by providing an implement carrier that can be used to move separate pieces of equipment or similar equipment pieces that are joined together in an excessive width or length. In general the equipment or implements are to be handled in their operative configuration so that the equipment may be moved directly from one point of use to a second for immediate reuse as soon as a tractor or other motive equipment is reattached thereto. The unit minimizes losses of time between points of work, and it accordingly improves the production efficiency of labor. The present system is intended to avoid the delays and problems inherent with previous systems for loading and unloading implements on a bed carrier or the inordinate time required in trailing separate pieces of equipment from one site to another.

In general a carrier is provided which has front and rear supports and an intermediate bridge frame with adequate distance between the supports to receive and support long assemblies of farm implements. Since no intermediate wheel or other ground support is provided, the assembled implements can be moved laterally away from the carrier for immediate resumption of work processes when a tractor is rehitched to the moved equipment. Such configuration distinguishes the present device from previous suspension-type carriers. The present system further incorporates unique steering and maneuvering capabilities so that the carrier can be moved into position above assembled implements so that equipment that is already unhitched may be handled.

SUMMARY OF THE INVENTION

The present invention provides a substantially elongated bridge-type frame structure disposed in elevated position between a forward fifth wheel mount and a rearwardly disposed steered wheel support. The power of a winch-type component is transmitted longitudinally along the frame and at spaced points suspension cables or chains depend downwardly from the support frame to be connected to assembled or separate implement components. Actuation of a power system causes the suspension members and any implements attached thereto to be raised until they are away from ground contact. When one implement combination has been elevated, it may be secured in place and other and additional implements may subsequently be raised to a carry position. Since all of the implements are disposed longitudinally along the length of the carrier, most items that are to be carried and the carrier itself will comply with highway load and width limitations. The assembled implements can be moved to a subsequent work site or they can be returned to storage in their assembled relation for later use. Since the carrier is of substantial length and since it is desirable to be able to maneuver the carrier into position above implements that are to be picked up, the rear wheel supports are steerable, and the end of the carrier may be moved along a path independent of a path determined by movement of a front motive power unit. Remote power and control systems are provided so that a single operator may position, pick up, deliver and uncouple the implements that are to be handled.

BRIEF DESCRIPTION OF THE DRAWINGS

FIG. 2 is a rear elevation of such carrier,

FIG. 3 is a partial front elevation showing the powered hoisting apparatus,

FIG. 4 is a partial view taken along the line 4—4 of FIG. 2 showing features of a remote steering system, and FIG. 5 is a partial cross-sectional elevation taken along the line 5—5 of FIG. 1 showing further details of the assembly and hoist components.

DESCRIPTION OF THE PREFERRED EMBODIMENT

Figure 1:
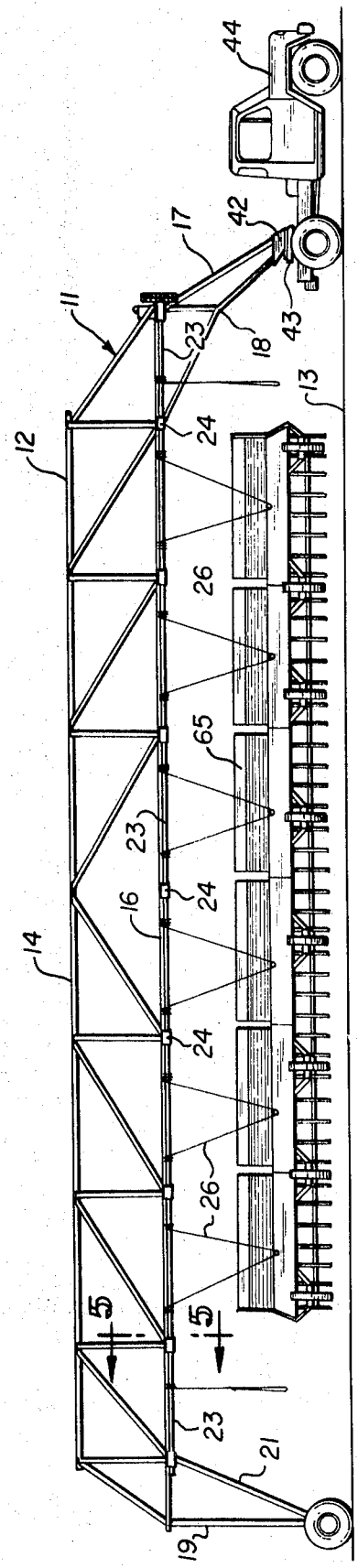
FIG. 1 is a side elevation showing features of the carrier.

In FIG. 1 the overall configuration of a preferred implement carrier embodiment is illustrated. Here the carrier 11 is shown to have an elongated frame 12 that is disposed at a substantial elevation above the ground line 13. The frame is of a bridge-type construction having top and bottom chords 14 and 16 interconnected by a lattice work of tension and compression truss webs that are cooperatively positioned and joined together to provide a frame of substantial strength and carrying capacity.

At the front the bridge frame 12 is held in elevated position by column and brace elements 17 and 18. It is similarly held in elevated position in the rear by rear columns 19 and braces 21. Suspended purlins 22 extend beneath the lower chords 16 to provide support for rotatably mounted winch-drum members 23 which are supported at each purlin 22 by bushings 24. With this arrangement power is applied at the ends of the drum member, and the drum which is preferably made of lengths of pipe is rotated in its bushings 24. A plurality of ropes or cables 26 are disposed at spaced positions along the length of the drum 23. These cables are reeved about the pipe or drum when the pipe is rotated to increase or shorten the effective length of the cables. Preferably the rotation of drum 23 is powered by mechanisms as shown in FIG. 3. In the embodiment illustrated a gear box 27 driven by a hydraulic motor 25 has an output shaft 28 and separate drive sprockets 29 which are interconnected to driven sprockets 31 and 32 of the pipe-drum elements 23 at opposite sides of the frame 12. Drive chains 33 and 34 interconnect the sprockets which are of different size to provide a torque-multiplying drive ratio. With the arrangement illustrated the drums 23 on opposite sides of the carrier are driven in the same rotative direction and at the same speed when hydraulic fluid under pressure is delivered to the motor 25 by the hydraulic lines 36. Since the drums 23 rotate in the same direction, the winding pattern for the cables on opposite sides of the carrier are as illustrated in FIG. 2. With this winding pattern the cables will be shortened or lengthened uniformly when the hydraulic motor is driven in its forward and reverse directions. Preferably all of the cables 26 are of equal length, and it is further desirable to provide connector chains at the ends of each cable. If a chain sling 37 having a pair of chain lengths 38 and 39 is disposed on the end of each cable 26 and each chain length is provided with hook ends 41, most all types and items of farm equipment can be readily engaged to the carrier.

The chain slings 37 provide further utility as illustrated in FIG. 2. The chains can be engaged to hold a first implement in raise position, while a second and separate implement is being raised or lowered by separate cables disposed at a separate position along the length of the carrier 11. As shown in FIG. 2, the chain 38 can be engaged to the purlin 22 or bottom chord element 16 while the chain 39 is still engaged to an implement. The load of any previously raised implement is then carried exclusively by the chain sling 37. Subsequent rotation of the drums 23 will not be effective to lower this particular implement even though other implements are being raised or lowered due to such rotation of the drums 23.

In order to move the carrier 12 about the fields or along roads, a wheel mount is provided. At the front the columns 17 are joined to a fifth wheel platform 42 so that it can be engaged to a fifth wheel mount 43 for a tractor or motive unit such as the trailer-tractor unit 44 shown. At the rear, crossbeam 46 interconnects the rear columns 19 and together with cross braces 47 provide cross support for a steerable axle component 48. Wheels 49 are rotatably mounted on spindles which pivot about a vertically disposed king pin axis 51 so that the wheels 49 may be steered. The Ackerman-type steering which is provided when the steering arms 52 are rotated can substantially change the position of the wheels 49 as indicated in FIG. 4.

A remote steering capability for this rear wheel mount is provided by a double-acting steering cylinder 53 which is interconnected to the link arm 54 extending between the steering arms 52. Extension and retraction of the cylinder shaft 57 will cause the wheels 49 to be turned. Powered movement of the cylinder 53 is controlled by hydraulic steering lines 56 which extend along the length of the carrier 11 all the way to the operator cab of the tractor 44. A steering control valve (not shown) is then positioned for convenient use by the operator so that the rear of the carrier may be steered independently of the tractor steering which is used to maneuver the front of the carrier. Since both the front and rear supports for the carrier may be separately or conjointly maneuvered, the carrier can be carefully maneuvered even under tight clearance conditions to bring the carrier above implements that are to be picked up or into other confined positions at field ends and the like where the implements are to be used or stored.

Though electric as well as hydraulic power could be used to drive the winching components and the steering mechanisms of the carrier, it has been found desirable to power both operations with a single power source. Since many farm implements are now operated or controlled by hydraulic power and since most farm tractors or even farm utility vehicles, such as the trailer-tractor 44 illustrated, are or can be conveniently provided with hydraulic pumps and controls, the hydraulic components illustrated represent a preferred embodiment of the invention. Where hydraulics are provided, quick disconnect couplings can be used adjacent the fifth wheel mount so that the carrier may be readily attached to or disengaged from the motive power unit. Further, while an operator control valve 66 is provided at the fifth wheel mount 42 for interconnection with and control of the motor drive lines 36, it is possible as well to mount this control in the operator cab.

The carrier described is capable of hauling substantial loads from place to place, and, accordingly, it has substantial utility in connection with farming operations. Preferably the carrier should be of adequate strength to haul or carry farm tractors and farm products as well as implements. Its special capability to handle long loads, such as the grain drill 65 illustrated, is a special advantage of the equipment. For illustrative purposes the grain drill illustrated would be 48 feet long. This type of equipment is made up of separate component items joined together to obtain the desired 48-foot field width. It is inconvenient to divide this type of equipment for the purpose of transport between fields. Further, it should be noted that even if broken down into 16-foot or 12-foot sections, this type of equipment cannot be trailed along roadways without substantially interfering with other traffic. In keeping with the present invention such equipment can be handled in assembled relation, and it can accordingly be immediately used at a new site. Width limitations can be met and implements can be picked up or deposited at relatively confined storage or use sites due to the maneuverability of the carrier units.

I claim:

1. A carrier mechanism for the transportation of farm machinery behind a motive power unit comprising a fifth wheel mount, an axle component disposed away from said fifth wheel, wheel elements on said axle, an elevated frame support interconnecting said fifth wheel mount and axle, a rotary winch type drum extending longitudinally along said frame support, depending equipment engaging elements operably moveable to raised and lowered positions as energized by said drum for elevating items of farm machinery away from earth contact for transport, means for steering said wheels, remote control means for use at said motive power unit for changing the operative position of said wheel steering means whereby the rear of said carrier may be directed along an independent course, a motor drive for rotating said winch drum, second control means for regulating said motor drive, a plurality of support bearings disposed along the length of said elevated frame structure at points intermediate the length thereof for the support of said drum, and a motive power unit for engagement with and support of said fifth wheel mount and wherein said elevated frame support is at all times when attached to said fifth wheel mount disposed at a position providing vertical clearance above said motive power unit.

2. Structure as set forth in claim 1 wherein said support bearings are of internal diameter larger than the external diameter of said drum whereby the drum may be moved and/or removed longitudinally therethrough.

3. Structure as set forth in claim 1 wherein said fifth wheel, said elevated frame support and other components of said carrier mechanism are at all times when attached to said fifth wheel mount cooperatively positioned to permit said motive power unit full circle freedom of movement when attached to said fifth wheel whereby the maneuverability characteristics of said carrier mechanism are improved.

4. Structure as set forth in claim 3 wherein said support bearings are of internal diameter larger than the external diameter of said drum whereby the drum may be moved and/or removed longitudinally therethrough.